Dec. 24, 1940.                A. KÄMPFER                2,225,870
PRESS FOR THE MANUFACTURE OF MULTILAYER NONSPLINTERING GLASS
Filed April 23, 1936
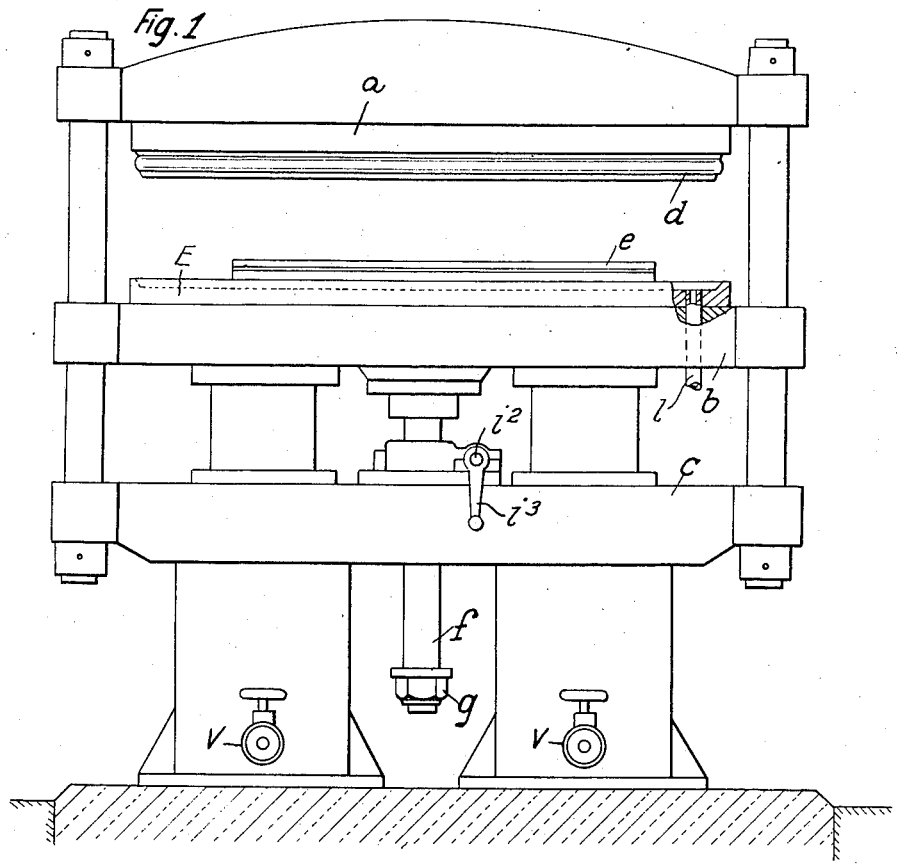
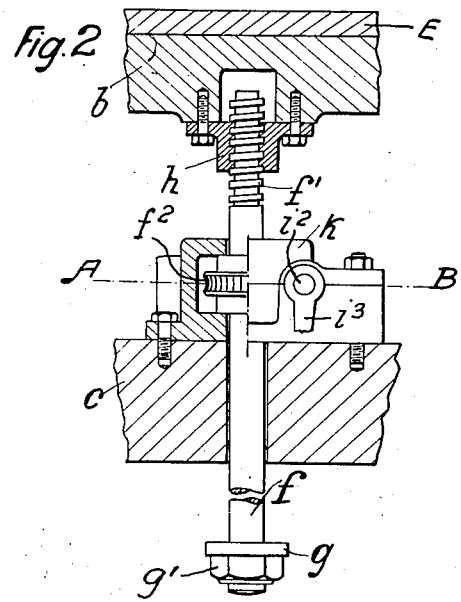
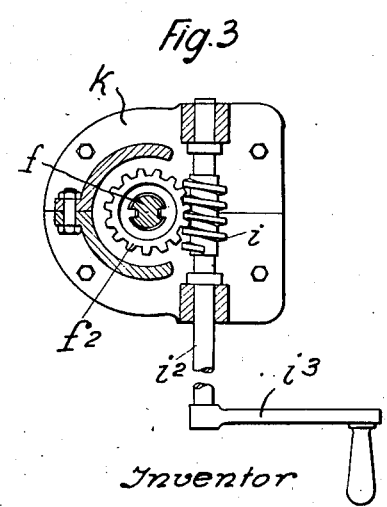
Inventor Patented Dec. 24, 1940

2,225,870

UNITED STATES PATENT OFFICE 2,225,870

PRESS FOR THE MANUFACTURE OF MULTI-LAYER NONSPLINTERING GLASS

Adolf Kämpfer, Charlottenburg, Berlin, Germany

Application April 23, 1936, Serial No. 76,045
In Germany September 21, 1935

7 Claims. (Cl. 18—17)

This invention relates to the manufacture of laminated, nonsplintering glass, and particularly to a press whereby the layers of glass and intermediate layers of initially plastic material (such as are disclosed in my application, Ser. No. 76,044, filed April 23, 1936) may be forced into permanently adhering contact. The manufacture of laminated glass requires that the laminations be pressed together in a space which may be evacuated, in order that no bubbles of air will be imprisoned during the pressing operation. Since the space requires to be evacuated almost up to the point of complete vacuum, it will be apparent that in addition to the pressure exerted on the dies by a gaseous, fluid or mechanical pressure agent there is also during the evacuation the atmospheric pressure acting on the movable platen of the press. This atmospheric pressure is not affected by the throttling effect on the pressure agent acting on the platens. It acts, therefore, without obstruction, and is considerable. For the purpose of compensating for this atmospheric pressure it has already been proposed to employ pressure cylinders between the two platens, the pistons of which are supported between the platens, and the pressure source of which is placed in such relation to the vacuum pump for evacuating the space that the effect of the one counterbalances the effect of the other. The pressure exerted on the work is then merely dependent on the regulatable pressure of the movable platen.

These auxiliary cylinders for the pressure agent are found to be unsatisfactory in practice. The consistency or viscosity of the operating fluids within the cylinders is subject to considerable fluctuation owing to differences or variations in temperature. A further objection resides in the fact that the packing collars composed of leather or rubber which are considerably affected by the high pressures and high temperatures in operation are rapidly reduced to a state of uselessness, making it necessary to stop the press until the requisite exchange has been effected.

The general object of my invention is the provision of a press which is so constructed as to take advantage of this atmospheric air pressure as a means for compressing said layers, and further to provide a press in which the atmospheric pressure may be augmented by additional pressure if required.

A further and more detailed object in this connection is to provide a frame of compressible material, the frame defining a chamber in which the layers of glass and plastic material may be disposed, this frame being placed between the platens of the press, and in this connection to provide means whereby the interior of the frame, after the platens have been brought in air-tight engagement with the frame, can be exhausted of air to a point nearly of complete exhaustion, in order that no bubbles of air shall be imprisoned within the plastic mass during the pressing operation.

A further object is to provide means acting, after the platens have been brought into air-tight contact with the frame, to permit the press platens to be further forced towards each other to compress the layers by atmospheric pressure assisted, if necessary, by the pressure of the motive fluid in the cylinders of the press.

One embodiment of the invention is illustrated by way of example in the accompanying drawing.

Fig. 1 is an elevation of a two-platen press constructed in accordance with this invention.

Fig. 2 is a sectional view through the stop spindle and its screw gear.

Fig. 3 is a section taken along the line A—B in Fig. 2.

The press includes the stationary platen $a$, the movable platen $b$ and the fixed transom $c$ at the upper end of the press cylinders C. Between the two platens $a$ and $b$, there is provided a rectangular or circular frame $d$ composed of resiliently compressible material which, when the platens $a$ and $b$ are moved to engage opposite faces of the frame, defines an air-tight work receiving chamber. The laminated glass $e$ is preferably located on the table of the movable platen $b$, this being for the purpose of rendering the sandwich of glass and plastic material readily accessible as soon as the movable lower platen is released and returns to its starting position. In Fig. 1, the laminated glass or sandwich $e$ is shown as being disposed upon a base plate E, the upper face of which surrounding the frame is provided with a recess, as shown in dotted lines, into which the lower end of the compressible frame $d$ enters or seats when the movable platen $b$ is being moved upward by the plungers of cylinders C.

Connected with the movable platen $b$ is a stop spindle $f$, which passes through an opening in the fixed transom $c$ and terminates in a nut $g$, by means of which the effective stop position of the spindle may be regulated.

Connected with the movable platen $b$ and movable therewith is a stop spindle $f$, as shown most clearly in Figure 2. This stop spindle at its lower end carries upon it the stop $g$, which may be part of a nut $g'$ and this nut may be adjustable toward or from the fixed transom $c$ through which the spindle passes, as shown in Figure 2. The upper end of the spindle $f$ is screw threaded, as at $f'$, and this screw threaded end is shown as engaging with an interiorly screw threaded collar $h$ mounted upon the lower face of the movable platen $b$. The platen is formed with a recess immediately above this collar $h$ to permit movement of the spindle towards or from the platen $b$. Mounted upon the transom $c$ is a bearing $k$ through which the spindle $f$ passes. Disposed within this bearing is a worm wheel $f^2$ having splined engagement with the spindle, as shown in Figure 3. This worm wheel is adapted to be rotated by means of the worm $i$, the shaft $i^2$ of which passes through the bearing box $k$, as shown in Figure 2. By rotating the worm-shaft $i^2$, the axial position of the stop spindle $f$ may be varied in relation to the movable platen $b$, the worm $i$ rotating the worm-wheel $f^2$, which in turn rotates the spindle $f$ and screws it into the threaded collar $h$ on the movable platen $b$. A hand crank $i^3$ or any suitable means may be employed for turning the shaft $i^2$. As shown in Fig. 1, the means whereby the air enclosed within the frame $d$ when the platen $b$ has been forced against the frame $d$ is exhausted, comprises a pipe $l$ which is shown as extending through the platen $b$ and opening into the recess in the upper face of the platen. Such a means for exhausting the air in the space enclosing the sandwich of laminated glass is disclosed in the U. S. Patent to Sherts, 1,959,221, granted May 15, 1934. It is to be understood, however, that I am not limited to this particular location for the exhausting pipe $l$. The mechanism operates as follows:

After the laminated glass has been placed on the table of the movable platen $b$, the latter is moved by compressed air, steam or other fluid pressure agent acting on the pistons toward the fixed platen $a$ until the frame $d$ composed of compressible material is pressed into air-tight contact with the two platens. To secure this movement of the movable platen $b$, the nut $g$ of the stop spindle $f$ is so adjusted that the stopping position in respect to the movable platen is initially determined by the engagement of the stop $g$ on the spindle $f$ with the lower face of the transom $c$. This stoppage occurs when the platen $b$ has been brought in airtight contact with the frame $d$ and has slightly compressed this frame without, however, submitting the sandwich of laminated glass to any more than a slight pressure. The supply of pressure agent to the cylinders of the press is then cut off and the further pressing action on the laminated glass $e$ is produced by atmospheric pressure which depends, of course, upon the degree of vacuum created within the frame $d$. To cause this atmospheric pressure to take effect, it is now necessary to rotate the worm shaft $i$, during the evacuation of the air within the frame, in a direction such that the distance between the transom $c$ and the stop $g$ thus is slightly increased. So long as the atmospheric pressure is effective, the platen $b$ will continue to be moved towards the platen $a$. This movement may be stopped at any point by properly adjusting the distance between the stop $g$ and the underface of the transom $c$ and by adjusting the spindle $f$ outward slightly, any desired further pressure may be secured either under the action of atmospheric pressure or, if necessary or desirable, by the aid of a further supply of pressure agent into the two cylinders of the press.

The adjustable stop mechanism, the action of which has been above described, prevents either the pressure agent in the cylinders from crushing the laminated glass or the crushing of the glass sandwich by atmospheric pressure and permits of a delicate and exact regulation of the degree to which the two layers of glass are forced towards each other and the extent to which the intermediate layer of viscid synthetic resin is compressed between the glass sheets.

An important feature of the invention resides in the fact that the movement of the movable platen is limited by a stop device to the amount which is necessary to form an air-tight chamber by the compression of the frame $d$ between the two platens, and further in the fact that the effective length of the stop device is variable.

An additional feature of importance associated with the invention consists in the fact that the screw gear for varying the effective length of the stop device does not preclude movement of the movable platen by the action of a pressure agent on the pistons of the press.

It will be seen that in the operation of this press, there are approximately five stages. First, fluid pressure forces the platen $b$ toward the platen $a$ until there is air-tight contact between these platens and the sandwich composed of laminated sheets or layers. Second, when the stop $g$ contacts with transom $c$, movement of the press stops. Third, the supply of fluid pressure to the cylinders C is cut off by the employment of suitable valves V, connection to the air pump or other air exhausting means is then opened through the pipe $d'$ and as this air exhaustion proceeds, the worm $i$ is operated to shift the spindle $f$ downward to carry the stop $g$ away from the transom. Atmospheric pressure then acts to press the platens towards each other and compress the frame and layers to an extent limited by the adjustment of the stop. Fifth, if and when movement ceases, the stop may be further lowered and fluid pressure again applied to the pistons of the cylinders.

It will be obvious that no limitation is made to the specific form of embodiment illustrated in the drawing, and that numerous modifications are quite possible within the meaning of the above description and the annexed claims without departing from the spirit of the invention.

What I claim as new and desire to secure by Letters Patent is:

1. A press of the character described, comprising opposed platens, one of which is movable, means for positively moving the said one platen against the other, means for stopping the action of said platen moving means, an open frame carried by one platen and defining a chamber for the reception of the work, the frame being positioned to be pressed between the platens, means communicating with the interior of said frame when the latter is pressed between the platens whereby said chamber may be exhausted of air when the platens have been forced into air-tight contact with the frame, said frame being of compressible material whereby upon cessation of applied pressure to the movable platen and upon the exhaustion of air from the interior of the frame, the movable platen may be further moved by atmospheric pressure in a direction to exert pressure on the work, means for initially limiting the movement of the platen to a position where both platens are in air-tight contact with said frame, and means for shifting said limiting means out of its limiting position to permit further movement of the movable platen under atmospheric pressure.

2. A press of the character described, including opposed platens, one of which is movable, means for positively moving said one platen against the other, means for stopping the action of said platen moving means, an open frame carried by one platen and defining a chamber for the reception of the work, the frame being positioned to be pressed between the platens, means communicating with the interior of said frame when pressed between the platens whereby said chamber may be exhausted of air when the platens have been forced into airtight contact with the frame, said frame being of compressible material whereby upon cessation of applied pressure by said moving means to the movable platen and upon the exhaustion of air from the interior of the frame, the movable platen may be further moved by atmospheric pressure in a direction to exert pressure on the work, a spindle attached to the movable platen and moving therewith and having a stop at one end limiting the movement of the movable platen initially to a position where the platens are in air-tight contact with the frame, and manually adjustable means for lengthening the effective length of said spindle whereby to permit the further movement of the movable platen under atmospheric pressure when the frame has been exhausted of air.

3. A press of the character described, including opposed platens, one of which is movable, means for moving said movable platen against the other platen, means for stopping the action of said platen moving means, an open frame carried by one platen and defining a chamber for the reception of the work, the frame being positioned to be pressed between the platens, means having connection with the interior of said frame when the frame is pressed between the platens whereby said chamber may be exhausted of air when the the platens have been forced into air-tight contact with the frame, said frame being of compressible material whereby upon cessation of applied pressure to the frame by the platens and upon the exhaustion of air from the interior of the frame, the movable platen may be further moved by atmospheric pressure in a direction to exert pressure on the work, the movable platen having a recess, a threaded collar carried by the movable platen and disposed over said recess, a threaded stop spindle passing through the threaded collar and into said recess and having an adjustable stop at one end, means for rotating said spindle to thereby adjust its effective length, the spindle having independent movement through said rotating means whereby the movable platen may be forced toward the opposed platen by atmospheric pressure after the frame has been exhausted of air.

4. A press of the character described, including opposed platens one of which is movable, a fixed element extending parallel to the movable platen, an open frame carried by one platen and defining a chamber for the reception of the work, the frame being positioned to be pressed between the platens, means whereby the chamber may be exhausted of air when the platens have been brought into pressing relation with the frame to establish air-tight contact therewith, the frame being of compressible material, motor operated means for forcing the movable platen toward the fixed platen, means for stopping the action of said motor operated means, means for limiting the movement of the movable platen to a point where the platens are in air-tight contact with the frame, said means including a spindle extending through the fixed element and connected to the movable platen and carrying a stop member engageable with the fixed element upon a predetermined movement of the movable platen, and manually operable means for adjustably increasing the effective length of said spindle to thereby permit atmospheric pressure to force the movable platen toward the fixed platen upon the exhaustion of air from within the frame.

5. A press of the character described, including opposed platens, one of which is movable, a fixed element extending parallel to the movable platen, an open frame carried by one platen and defining a chamber for the reception of the work, the frame being positioned to be pressed between the platens, means whereby the chamber may be exhausted of air when the platens have been brought into pressing relation with the frame to establish an air-tight contact therewith, the frame being of compressible material, motor operated means for forcing the movable platen toward the fixed platen, means for stopping the action of said motor operated means, means for limiting the movement of the movable platen to a point where the platens are pressed against and in air-tight contact with the frame, said means including a spindle, the spindle having a stop at one end, the spindle passing through the fixed element, an interiorly screw threaded collar mounted upon the movable platen, there being a recess within the platen opposite the aperture in said collar, the spindle having threads engaging the threads of the collar, a bearing mounted upon the fixed element, a worm wheel carried by the bearing through which the spindle passes and to which it is splined, and a manually operable worm engaging said worm wheel and mounted in said bearing whereby the effective distance between the stop and the fixed element may be lengthened when and as the air is exhausted from the interior of said frame.

6. A press of the character described, including a fixed platen and a movable platen, pressure operated means for forcing the movable platen toward the fixed platen, means for stopping the action of said pressure operated means, an open frame secured against the face of one of said platens and defining a chamber for the reception of the work, the frame being positioned to be pressed between the platens, means whereby said chamber may be exhausted of air when the frame is pressed between the platens and in airtight contact therewith, a fixed transom extending parallel to the movable platen, a stop spindle extending through the transom and having on one end an adjustable stop, the other end of the spindle being screw threaded, a collar mounted upon the movable platen and with which the spindle has threaded engagement, the latter platen having a recess registering with said collar into which the end of the spindle projects, a bearing mounted upon the transom, a worm wheel carried by said bearing and supporting the spindle, the spindle having splined engagement with the worm wheel to permit independent longitudinal movement of the spindle with relation to the worm wheel, and a manually operable worm carried in said bearing and engaging the worm wheel.

7. A press of the character described, including opposed platens, one of which is fixed and the other being movable relative thereto, means for positively forcing the platens into compressing relation, means for stopping movement of the movable platen by said first means, an open frame carried by one platen and defining a chamber for the reception of the work, the frame being positioned to be pressed between the platens, means communicating with the interior of said frame when the latter is pressed between the platens whereby the chamber defined by the frame may be exhausted of air, the pressing of the frame between the platens establishing an airtight contact between the frame and the platens, said frame being of compressible material whereby upon cessation of the application of pressure forcing the platens together and upon the exhaustion of air from the interior of the frame, the platens may be further brought together by atmospheric pressure to exert pressure on the work, and a stop member adjustably secured to the movable platen and having sliding engagement with a fixed part of the press, the stop including a member engaging said fixed part upon predetermined movement of the platen carrying the stop member.

ADOLF KÄMPFER.